June 9, 1964     L. E. WOLINSKI     3,136,655
METHOD OF COATING POLYETHYLENE TEREPHTHALATE FILM, COATED
ARTICLE AND COMPOSITION THEREFOR
Filed April 22, 1960
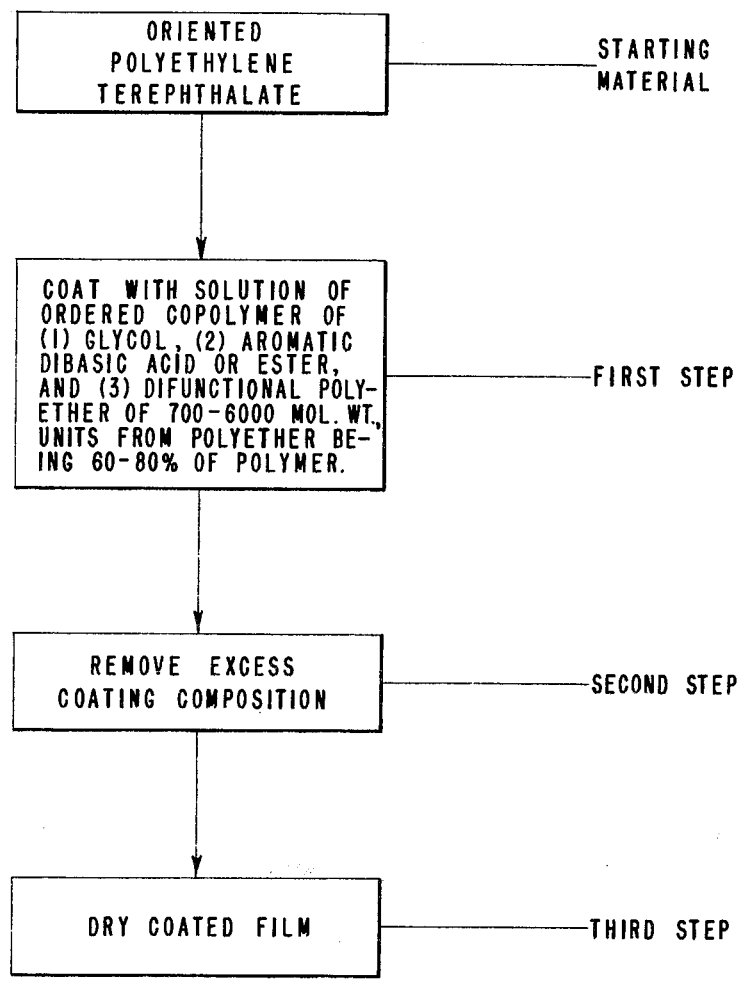
INVENTOR
LEON E. WOLINSKI
BY *Herbert M. Wolfson*
ATTORNEY 3,136,655
METHOD OF COATING POLYETHYLENE TEREPH-THALATE FILM, COATED ARTICLE AND COMPOSITION THEREFOR
Leon E. Wolinski, Buffalo, N.Y., assignor to E. I. du Pont de Nemours and Company, Wilmington, Del., a corporation of Delaware
Filed Apr. 22, 1960, Ser. No. 23,889
27 Claims. (Cl. 117—122)

This invention relates to the manufacture of thermoplastic polymeric films and, more particularly, to the preparation of polyethylene terephthalate films suitable for conversion to bags, containers and similar packages.

The desired properties of packaging film are well known. They include strength, durability, high gloss, clarity, ability to slip, ability to form strong and durable heat-seals, etc. In the case of thermoplastic polymeric materials such as polyethylene terephthalate film, strength is obtained by orienting the film in a stretching and/or rolling operation and the orientation is stabilized in a heat-setting step. Orienting, however, increases the degree of crystallinity and induces other micro-structural changes which tend to impair some of the remaining properties of the film. For example, after orienting polyethylene terephthalate film, it is very difficult to heat-seal the film in most conventional heat-sealing apparatus and obtain durable bonds. Attempting to heat-seal the film usually results in severe shrinkage with accompanying puckering and weakness at the seal. If heat-sealing is accomplished, then the durability of the heat-seal is extremely poor. It is an object of this invention to provide a polyethylene terephthalate film suitable for use as a packaging film which does not have the above shortcomings. Another object is to specify a process for preparing such a film. Other objects will appear hereinafter.

The objects are accomplished by providing a base film of oriented polyethylene terephthalate having at least one surface coated with a coating composition comprising at least 80%, preferably 95%–98% of an ordered copolymer obtained from a glycol having the formula $$HO(CH_2)_aOH$$

wherein "$a$" is an integer having a value of 2–10, preferably ethylene glycol, at least one compound selected from the group consisting of aromatic dibasic acids and their esters, preferably dimethylterephthalate, and at least one difunctional polyether having the formula $$HO(RO)_nH$$

in which R is a divalent hydrocarbon radical having 2–4 carbon atoms and "$n$" is an integer having a value sufficient to provide a molecular weight for the polyether of 700–6,000, preferably from the group consisting of poly(tetramethylene oxide)glycol having a molecular weight of 700–3,000 and poly(ethylene oxide)glycol having a molecular weight of 1,000–6,000, the polyether-polyester units derived from the difunctional polyether representing 60%–80% by weight of the final copolymer; the remainder of the coating composition is preferably a fatty acid amide having 12–18 carbon atoms.

The ordered copolymers in the composition are determined by the choice of reactive components. Since polyethers are composed of a series of units in block form, the use of a substantial quantity of a polyether insures the formation of an ordered polymer. When the polyether is reacted with the dibasic acid, the only configurations that can be formed are secondary units also in block form, e.g., polyester units. The size of the units is controlled by selection of the molecular weight of the polyethers and may vary anywhere from about 10 to about 200 units in each block. The ordered copolymer may be prepared my subjecting one or more aromatic dibasic acids or their ester-forming derivatives, one or more difunctional polyethers with the formula HO(RO)$_n$H (in which R is one or more divalent organic radicals and "$n$" is an integer of a value to provide a glycol with a molecular weight of between 700 and 6,000), and one or more lower aliphatic glycols with the formula HO(CH$_2$)$_a$OH (in which "$a$" is 2 to 10), to an ester interchange reaction followed by polymerization to produce a copolyester.

Representative difunctional polyethers which may be used include the poly(alkylene oxide)glycols, such as poly(ethylene oxide)glycol, poly(propylene oxide)glycol, and poly(tetramethylene oxide)glycol. Mixtures of glycols may also be used to prepare copolyethers, e.g., one which would have both ethylene oxide and tetramethylene oxide units in the polyether chain. Some of the alkylene radicals in these polyethers may be replaced by divalent cycloaliphatic radicals.

The difunctional polyether may have a singular molecular weight; it may be a blend of a low and a high molecular weight compound; or it may be a blend of several compounds of graduating molecular weight. It is preferred, however, that the difunctional polyether be a mixture of such polymers having a relatively narrow range of molecular weight.

Copolyesters imparting the desired properties to the coating compositions are those in which the final polymer coating compositions contains about 60% to about 80% by weight of polyether-polyester units prepared from the difunctional polyether. By staying within this range, the coating composition imparts heat-sealability and other important properties to the oriented polyethylene terephthalate base film without adversely affectitng the slip properties of the film. The weight percent of the polyether-polyester in the copolymer is calculated in the following manner. A representative copolymer derived from ethylene glycol, poly(ethylene oxide)glycol and dimethylterephthalate may have the formula:

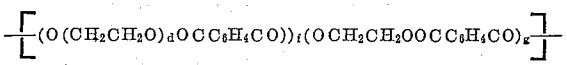

in which $d$, $f$ and $g$ are integers.

The percent by weight of poly(ethylene oxide)glycol terephthalate units in the polymer (percent PEGT) is equal to $$\frac{Wt.\ PEG\ \frac{PEGT}{PEG} \times 100}{Wt.\ PEG\ \frac{PEGT}{PEG} + \left[\left(wt.\ DMT - wt.\ PEG\ \frac{DMT}{PEG}\right)\frac{EGT}{DMT}\right]}$$

wherein

Wt. PEG = weight poly(ethylene oxide)glycol used,
Wt. DMT = weight dimethyl terephthalate used,
PEGT = molecular weight of PEGT unit,
EGT = molecular weight of ethylene terephthalate unit,[1]
PEG = molecular weight of poly(ethylene oxide)glycol, and
DMT = molecular weight of dimethyl terephthalate.

This calculation requires that the molecular weight of the difunctional polyether be known. In some instances it may be difficult to obtain precise values for the molecular weight of the higher molecular weight difunctional polyethers. However, even by using an approximate value, the calculation will provide reasonable accuracy.

Terephthalic acid or its derivatives, because of their relatively low cost and ready availability, will be used to prepare a majority of the compositions falling within the definition of the invention. However, aromatic dibasic acids, in general, are useful in the invention and include terephthalic acid, bibenzoic acid, ethylene-bis-p-oxy- ---
[1] The unit referred to is (OCH$_2$CH$_2$OOCC$_6$H$_4$CO).

benzoic acid, tetramethylene-bis-p-oxybenzoic acid, and the naphthalene dicarboxylic acids. Ester-forming derivatives of these acids may also be used, and these include such compounds as the methyl, ethyl, phenyl, and monomeric ethylene glycol esters. Also, the acids can be employed as the acid halides. The ester end groups of the polyether-polyester unit can be obtained by using either difunctional aliphatic or aromatic acid derivatives of the polyether, it being recognized, of course, that substantially all of the acid units in the remainder of the copolymer molecule will be aromatic.

Aliphatic dibasic acids or their esters may also be used in the copolyether coating compositions to act as flexibilizing agents. The use of these aliphatic acid components gives a regularity in the linear structure of the copolymer allowing for the required space for crystallization to take place. Where good hydrolytic stability is required in a coating composition, the most suitable dibasic aliphatic acids which may be employed will be the $\alpha,\alpha$-disubstituted aliphatic acids such as isosebacic acid ($\alpha,\alpha',\alpha'$-tetramethyl adipic acid). Addition of these compounds tends to reduce the melt temperature, and as a consequence more flexibility is obtained and a lowering of the heat-seal temperature is realized. The amount of aliphatic dibasic acid used will vary from none to an amount that will replace 50% of the dibasic aromatic acid in the preparation of the polymer.

The most useful lower aliphatic glycol for this invention is ethylene glycol. However, "a" in the formula for the glycol $HO(CH_2)_aOH$ may vary from 2–10, depending on the temperature to which the final film will be subjected during heat-sealing. In the following table, the maximum temperature is presented for several values of "a." It should be understood that values between the listed "a's" will provide corresponding intermediate temperatures.

TABLE I

| Value of "a" in $HO(CH_2)_aOH$: | Maximum temperature, (° C.) |
|---|---|
| 2 | 265 |
| 4 | 226 |
| 6 | 152 |
| 8 | 132 |
| 10 | 129 |

The melt polymerization process employed and described in some detail in Example 1 is the conventional procedure first described in U.S. Patents 2,071,250 and 2,071,251 to Carothers. Thus, the copolyesters may be prepared in the melt by the action of the glycols on the dibasic acids or one of their ester-forming derivatives. For example, the dimethyl esters of the acids involved together with an excess of the glycols may be initially heated together in the molten state and at atmospheric pressure. Polymerization may also be carried out starting with solid reactants. After the ester interchange is complete, as indicated by the cessation of the evolution of methanol, the pressure is gradually reduced to about 0.5 millimeter of mercury and the temperature increased to 240° C.–280° C. These conditions are maintained for about 4–5 hours with stirring to provide a polymer of the desired inherent viscosity.

The polymerization step generally requires from 1 to 30 hours after a full vacuum has been achieved. The actual length of time varies with concentration, temperature, inherent viscosity desired, amount of color allowable in the finished polymer, degree of vacuum obtained, etc. The use of a catalyst will also change the timing of the cycle considerably. Suitable catalysts are described in U.S. Patent 2,465,319 to Whinfield and Dickson, U.S. Patent 2,921,051 to Amborski, Izard and Sroog, and U.S. Patent 2,518,283 to Casassa. Economy militates for a relatively short polymerization cycle. It has also been found that if the polymerization cycle is too long, the competing and irreversible thermal degradation reaction has sufficient time to lower the inherent viscosity more than the polymerization reaction can raise it. Polymerization is continued until the molten polymer has reached the desired inherent viscosity. For optimum results, the copolyesters should have an inherent viscosity of 0.6–1.5 or above. This is to say that the copolyesters of particular interest are those with molecular weights in the film-forming range, i.e., above about 10,000. Polymers having a molecular weight of 15,000 to 40,000 are the most desirable. For the purpose of this invention, inherent viscosity is defined as:

$$\frac{\ln \text{ relative viscosity}}{C}$$

where relative viscosity is the ratio of the viscosity of a dilute solution of the polymer in a 60:40 mixture of phenol and tetrachloroethane to the viscosity of the solvent and C is the concentration in grams of the polymer per 100 ml. of solution.

After preparing the copolyester, it can be dissolved in a suitable solvent. The preferred solvent is a 50–50 mixture of toluene and dioxane. Other satisfactory solvents include toluene alone, butyrolactone, dimethyl sulfoxide and dimethyl formamide. The total solids content in the coating solutions may range from 10% to 30% with 15%–20% being prefered. The copolyester may comprise anywhere from 80% to 100% of the solids content. However, it has been found that to obtain the best combination of surface properties and strong, durable heat-seals, the addition of 2%–5% of the $C_{12}$ to $C_{18}$ fatty acid amide is desirable. The preferred amides are tetradecanamide and n-octadecanamide.

The coatings may be applied to the base polyethylene terephthalate film in accordance with any known coating techniques. They may be applied by passing the film through baths in a continuous manner or in a batch process. The coatings may also be sprayed on the film or applied manually by brushing or the like. It is also possible to merely melt the copolyesters, instead of dissolving them in solvents, and apply the molten copolyester to the film in accordance with any melt coating technique. The thickness of the coatings may be adjusted in accordance with methods well known in the melt or solvent coating art. It is desirable for purposes of the present invention that the coating represent at least 5% of the weight of the final coated polyethylene terephthalate film.

The coated films of the present invention permit the use of polyethylene terephthalate films in a variety of fields, particularly in the packaging field. Single coated polyethylene terephthalate films, heretofore limited to use as overwraps because of poor heat-seal durability, can be prepared by the present invention to possess the requisite physical properties and surface qualities of a general packaging film. Single coated films of this invention possess good machine runability and can be heat-sealed to form commercially acceptable packages, the seals being strong and durable. These coated films may be used for packaging a variety of items that include food, cigarettes, etc.

The invention will be more clearly understood by referring to the following examples and to the drawing. Example 1 representing the best mode contemplated for performing the invention. These examples, although illustrating specific embodiments of the present invention, should not be considered limitative.

*Examples 1–2*

A copolymer was prepared from the following charge:

| | Weight (grams) |
|---|---|
| Poly(tetramethylene oxide)glycol having a molecular weight of 1600 | 1200 |
| Dimethylterephthalate | 400 |
| Ethylene glycol | 525 |
| Zinc acetate | 0.046 |
| Antimony oxide | 0.046 |
| Lithium hydride | 0.011 |

The poly(tetramethylene oxide) glycol was carefully dried and placed in a reactor. The reactor was a vessel fitted with a nitrogen bleed tube, a thermometer and a fractionating column. The remaining ingredients of the charge were then added to the reactor. The nitrogen bleed tube led below the surface of the mixture and served to provide an inert atmosphere. The mixture was heated to a temperature of about 65° C. to distill methanol, the product of ester exchange between the dimethylterephthalate and the glycols. After substantially all the methanol was removed, the temperature rose to about 203° C. where the excess ethylene glycol was distilled. The reaction temperature was then permitted to rise to about 235° C. before heating was stopped. The ester exchange period required about seven hours.

The monomer mixture was then transferred to a polymerization flask while protected from atmospheric moisture. The flask was fitted with a stirrer, a nitrogen bleed tube and a reflux condenser. A stream of nitrogen was bubbled through the mixture for 60 minutes; the vessel was evacuated and maintained at a pressure of 0.1–0.4 millimeter of mercury by using a vacuum pump protected by Dry Ice/acetone traps and regulated by a mercury manometer with a choke valve. The contents were stirred continuously while they were heated to a temperature of about 270° C. where the temperature was maintained for 8 hours. The resulting polymer, having a ratio of 25 ethylene glycol terephthalate units to 75 poly(tetramethylene oxide)glycol terephthalate units, had an inherent viscosity of 0.96.

The coating solution was prepared by first dissolving 15 grams of the polymer in 85 grams of a 50–50 mixture of toluene-dioxane followed by dissolving 0.75 gram of n-octadecanamide ("Armid" O obtained from Armour and Company, Chicago, Illinois), therein.

Polyethylene terephthalate, prepared as disclosed in U.S. Patent No. 2,465,319 was extruded as a molten amorphous material through a narrow orifice to form a film. The film was stretched 3 times its original dimensions in two directions at a temperature of 80° C. and then heat-set at a temperature of about 200° C. while holding it under tension to prevent any shrinkage. The oriented film was coated in a conventional solvent coating tower by passing it at a rate of 6 feet per minute through a dip pan containing the coating solution at room temperature. Excess coating solution was removed and smoothed on the film by passing the film between doctor rolls set at 1½ mils. The coated film was finally passed through the drier section of the tower which was maintained at a temperature of 110° C.–120° C. The coated film had a total coating weight (both sides) of 8 grams per square meter.

The coated film, showing no evidence of tackiness, was tested along with control A and Example 2 for heat-seal strength, durability and for its slip and blocking characteristics, and the results are presented in Table II.

As control A, an uncoated oriented polyethylene terephthalate film that had been stretched and heat-set as described above, was used.

As Example 2, a coated oriented polyethylene terephthalate film was used but the amide was omitted from the coating solution. In all other respects, the procedure was identical to Example 1.

TABLE II

| Example | Heat-Seal Strength (grams/inch) | Durability | | Slip, High/Low | Block |
| --- | --- | --- | --- | --- | --- |
| | | Room Temp. | −18° C. | | |
| 1 | 890 | 825 P5 | 42 P5 | 2/1 | 1 |
| 2 | 860 | 863 P5 | 52 P5 | 4/4 | 4 |
| Control A | 0 | 0 | 0 | 2/1 | 1–2 |

Heat-seal strength was determined by sealing two coated film surfaces together with a ¾ inch wide bar, 4 inches long, using a sealing temperature of 160° C., 20 lbs./sq. inch pressure and a dwell time of 2 seconds. The film was cut into 1 inch wide seals, and after conditioning 24 hours at 38% relative humidity and 75° F., was pulled in a Suter Tester. The average of ten values was reported. The minimum acceptable heat-seal value for film to be utilized for packaging purposes is 300 grams per inch.

Durability, which is the bag (heat-seal) durability, was determined by using a fin seal rice pouch made by folding a 4½" x 12" sheet of film in half and sealing it along the two edges with a ⅝" wide seal (160° C., 20 lbs./sq. inch, 2 second dwell time). The bags were filled with 100 grams of rice and sealed in the same manner across the top. The inside dimensions were about 3" x 3¾". The bags were then conditioned at 75° F. for 1 day or at 75° F. for 1 day followed by 1 day at 0° F. (−18° C.). The test consisted of dropping the bags from a 30" height (bench top to top of bag) on the unsealed edge until loss of rice occurred. The bags were rated by the number of drops survived as well as the type of failure. For example, $5P_36T_4$ means that 3 bags failed by peeling with an average survival of 5 drops, and 4 bags failed by tearing of the film in the seal area with an average survival of 6 drops. The average of 5 bag drops is reported at room temperature and −18° C. The minimum acceptable number of drops for a packaging film is 7.

Slip was measured manually and rated according to the following standards:

1–2 (high pressure slip)—no amount of pressure exerted on two film surfaces held together between thumb and forefinger is sufficient to prevent two surfaces from slipping over each other under a tangential force.

3–4 (low pressure slip)—two film surfaces will slide past each other only when moderate pressure is exerted normal to the film surfaces.

5 (no slip)—no matter how lightly two film surfaces are held together, they will not slip past each other under a tangential force.

Blocking is determined using the method of MRTM #2123 with the ratings given according to the following scheme:

Grade 1—Individual sheets separate from the pile with little shear stress exerted between the thumb and forefinger.

Grade 2—Individual sheets and small groups separate with some resistance.

Grade 3—Only large groups separate with considerable resistance to thumb and forefinger.

Grade 4—Separation of pile can only be brought about by shear stress exerted between palms of hands.

Grade 5—Separation of pile can only be affected by peeling off sheets.

*Examples 3–9*

Dimethylterephthalate and an amount of ethylene glycol corresponding to more than 2 mole equivalents of dimethylterephthalate were reacted with poly(tetramethyleneoxide)glycol having a molecular weight of 1600 using the conditions and catalysts shown in Example 1. The amount of the poly(tetramethylene oxide)glycol used provided 70 weight percent of polyether-polyester units from this glycol in the final copolymer.

The polymer was dissolved in a 50–50 mixture of toluene-dioxane and varying amounts of n-octadecanamide were dissolved in 6 portions of the polymer solution to provide 2.0% by weight of the amide in Example 3; 2.5% in Example 4; 3.0% in Example 5; 4.0% in Example 6; 5.0% in Examples 7 and 8; and 20.0% in Example 9 as shown in Table III.

Coating of the oriented polyethylene terephthalate film described in Example 1 was carried out as in Example 1 to provide polymeric coatings that, after drying, represented at least 5% by weight of the coated film. The coating weights are also given in Table III. After drying, the coated films, which all showed no tackiness, were tested for heat-seal strength, durability, slip and blocking. The results are presented in Table III.

TABLE III

| Ex. | Percent Amide | Coating Wt. (gms./m.²) | Heat-Seal Strength | Durability | | Slip | Block |
|---|---|---|---|---|---|---|---|
| | | | | Room Temp. | −18° C. | | |
| 3 | 2.0 | 9.2 | 654 | 81 P$_5$ | 42 P$_1$ | 2 | 2 |
| 4 | 2.5 | 16.9 | 674 | 247 P$_5$ | 129 P$_1$ | 2 | 1 |
| 5 | 3.0 | 3.0 | 586 | 187 P$_5$ | 32 P$_4$ | 2 | 1 |
| 6 | 4.0 | 2.3 | 349 | 38 P$_5$ | 48 P$_5$ | 1 | 1 |
| 7 | 5.0 | 12.0 | 873 | 248 P$_5$ | 21 T$_6$ | 1 | 1 |
| 8 | 5.0 | 6.3 | 750 | 240 P$_5$ | 70 P$_5$ | 1 | 1 |
| 9 | 20.0 | 14.0 | 900 | 284 P$_5$ | 108 P$_4$ | 1 | 1 |

*Example 10*

Example I was repeated using poly(tetramethylene oxide)glycol having a molecular weight of 1600 to provide 75 weight percent of the polyether-polyester units from this glycol in the final polymer. The only difference from Example 1 was that the amount of n-octadecanamide used as the additive was 2.5% of the weight of the coating composition.

Coating of oriented polyethylene terephthalate film was carried out as in Example 1 to provide, after drying, a coating weight of 8.9 grams per square meter. The coated film was not tacky and displayed the following properties.

Heat-seal strength _____ 870 grams/inch.
Durability:
    Room temperature _____ 500 P$_5$.
    −18° C _____ 18 T$_6$.
Slip _____ 2.
Block _____ 2.

*Example 11*

Example 4 was repeated using poly(tetramethylene oxide)glycol having a molecular weight of 1600 to provide 70 weight percent of the polyether-polyester units from this glycol and 30 weight percent of the polyether-polyester units from the ethylene glycol in the final polymer. When the polymer was dissolved in the toluene-dioxane mixture, 2.5% by weight of tetradecanamide ("Armid" 14 obtained from Armour and Company, Chicago, Illinois), was also dissolved to provide the coating solution. Coating of oriented polyethylene terephthalate film was carried out as in Example 1 to provide, after drying, a coating weight of 6.4 grams per square meter. The coated film was not tacky and displayed the following properties.

Heat-seal strength _____ 610 grams/inch.
Durability:
    Room temperature _____ 79 P$_5$.
    −18° C _____ 38 P$_2$.
Slip _____ 2.
Block _____ 2.

*Examples 12–14*

Dimethylterephthalate and an amount of ethylene glycol corresponding to more than 2 mole equivalents of dimethylterephthalate were reacted with poly(ethylene oxide)glycol having a folecular weight of 4000 using the conditions and catalysts shown in Example 1. The amount of the poly(ethylene oxide)glycol used provided 80 weight percent of polyether-polyester units from this glycol in the final copolymer.

The polymer was dissolved in a 50–50 mixture of toluene-dioxane and varying amounts of n-octadecanamide were dissolved in 6 portions of the polymer solution to provide 2.5% by weight of the amide in Example 12; 4.0% in Example 13 and 5.0% in Example 14, as shown in Table IV.

Coating of the oriented polyethylene terephthalate film described in Example 1 was carried out as in Example 1 to provide polymeric coatings that, after drying, represented at least 5% by weight of the coated film. After drying, the coated films, which all showed no tackiness, were tested for heat-seal strength, durability, slip and blocking. The results are presented in Table IV.

TABLE IV

| Ex. | Percent Amide | Heat-Seal Strength | Durability | | Slip | Block |
|---|---|---|---|---|---|---|
| | | | Room Temp. | −18° C. | | |
| 12 | 2.5 | 564 | 1,045 P$_4$ | 24 P$_3$ | 2 | 2 |
| 13 | 4.0 | 750 | 375 P$_5$ | 35 P$_5$ | 1 | 2 |
| 14 | 5.0 | 540 | 415 P$_3$ | 28 P$_5$ | 1 | 1 |

*Example 15*

Example 1 was repeated using poly(ethylene oxide) glycol having a molecular weight of 4000 to provide 70 weight percent of the polyether-polyester units from this glycol in the final polymer. The amount of n-octadecanamide used as the additive was 2.5% of the weight of the coating composition.

Coating of oriented polyethylene terephthalate film was carried out as in Example 1 to provide, after drying, a coating weight of 8.9 grams per square meter. The coated film was not tacky and displayed the following properties.

Heat-seal strength _____ 595 grams/inch.
Durability:
    Room temperature _____ 37 P$_5$.
    −18° C _____ 7 P$_4$.
Slip _____ 2.
Block _____ 2.

*Example 16*

Example 1 was repeated using poly(ethylene oxide) glycol having a molecular weight of 6000 to provide 70 weight percent of the polyether-polyester units from this glycol in the final polymer. The amount of n-octadecanamide used as the additive was 5.0% of the weight of the coating composition.

Coating of oriented polyethylene terephthalate film was carried out as in Example 1 to provide, after drying, a coating weight of 8.0 grams per square meter. The coated film was not tacky and displayed the following properties.

Heat-seal strength _____ 460 grams/inch.
Durability:
    Room temperature _____ 22 P$_3$.
    −18° C _____ 11 P$_5$.
Slip _____ 1.
Block _____ 1.

*Example 17*

Example 1 was repeated using poly(ethylene oxide) glycol having a molecular weight of 6000 to provide 80 weight percent of the polyether-polyester units from this glycol in the final polymer. The amount of n-octadecanamide used as the additive was 5.0% of the weight of the coating composition.

Coating of oriented polyethylene terephthalate film was carried out as in Example 1 to provide, after drying, a coating weight of 10.0 grams per square meter. The coated film was not tacky and displayed the following properties.

Heat-seal strength _____ 430 grams/inch.
Durability:
    Room temperature _____ 27 P$_3$.
    −18° C _____ 18 P$_5$.
Slip _____ 1.
Block _____ 1.

Example 18

A mixture of esters was polymerized in a manner similar to that described in Example 1. The mixture was made up of 25% of an ester derived from ethylene glycol, poly(ethylene oxide)glycol having a molecular weight of 4000 and dimethylterephthalate in which the ethylene glycol contributed to 20% of the ester units; and 75% of an ester derived from ethylene glycol, poly(tetramethylene oxide)glycol having a molecular weight of 1600 and dimethylterephthalate in which the ethylene glycol contributed to 30% of the ester units.

The polymer was dissolved in a 50–50 mixture of toluene-dioxane and n-octadecanamide was added to provide 2.5% by weight of the amide in the solution.

Coating of polyethylene terephthalate film was carried out as in Example 1 to provide a polymeric coating that, after drying, represented 10.2 grams per square meter of the film. The coated film was not tacky and displayed the following properties.

Heat-seal strength _____ 518 grams/inch.
Durability:
    Room temperature _____ 590 $P_5$.
    −18° C _____ 13 $T_5$.
Slip _____ 2.
Block _____ 1.

Examples 19–20

A 50–50 mixture of the same esters used in Example 18 was polymerized in a manner similar to that described in Example 1. The polymer was dissolved in a 50–50 mixture of toluene-dioxane and n-octadecanamide was added to provide 5.0% by weight of the amide in the solution.

Coating of polyethylene terephthalate film was carried out as in Example 1 to provide, after drying, a coating weight of 12.4 grams per square meter in Example 19 and 11.0 grams per square meter in Example 20. The coated films were not tacky and displayed the properties shown in Table V.

TABLE V

| Ex. | Heat-Seal Strength | Durability | | Slip | Block |
|---|---|---|---|---|---|
| | | Room Temp. | −18° C. | | |
| 19 | 690 | 1,072 $P_5$ | 64 $P_1$ | 2 | 2 |
| 20 | 664 | 330 $P_5$ | 85 $P_5$ | 1 | 1 |

Example 21

A mixture of esters was polymerized in a manner similar to that described in Example 1. The mixture was made up of 25% of an ester derived from ethylene glycol, poly(ethylene oxide)glycol having a molecular weight of 1540 and dimethylterephthalate in which the ethylene glycol contributed to 40% of the ester units; and 75% of an ester derived from ethylene glycol, poly(tetramethylene oxide)glycol having a molecular weight of 1600 and dimethylterephthalate in which the ethylene glycol contributed to 30% of the ester units.

The polymer was dissolved in a 50–50 mixture of toluene-dioxane and n-octadecanamide was added to provide 5.0% by weight of the amide in the solution.

Coating of polyethylene terephthalate film was carried out as in Example 1 to provide, after drying, a coating weight of 6.0 grams per square meter. The coated film was not tacky and displayed the following properties.

Heat-seal strength _____ 570 grams/inch.
Durability:
    Room temperature _____ 157 $P_5$.
    −18° C _____ 46 $P_2$.
Slip _____ 2.
Block _____ 2.

Examples 22–23

A copolymer was prepared in the manner described for Example 1 from the following charge:

Weight (grams)
Poly(tetramethylene oxide)glycol having a molecular weight of 1600 _____ 1200
2,6-naphthalene dicarboxylic acid _____ 443
Ethylene glycol _____ 280
Zinc acetate _____ 0.046
Antimony oxide _____ 0.046
Lithium hydride _____ 0.011

The ester exchange reaction was completed in 5 hours. The polymerization reaction which was performed under high vacuum as in Example 1 was carried out for 12 hours to provide a polymer having an inherent viscosity of 0.96. The final polymer had a ratio of 25 polyetherpolyester units derived from ethylene glycol and the naphthalene dicarboxylic acid and 75 polyether-polyester units derived from the poly(tetramethylene oxide)glycol and the naphthalene dicarboxylic acid.

Coating solutions were prepared by dissolving the copolymer in a 50–50 mixture of toluene-dioxane using 2% by weight of n-octadecanamide in Example 22 and none of the amide in Example 23.

Coating of polyethylene terephthalate film was carried out as in Example 1 to provide, after drying, a coating weight of 8.0 grams per square meter in both examples. The properties of the coated films are presented in Table VI.

TABLE VI

| Ex. | Heat-Seal Strength | Durability | | Slip | Block |
|---|---|---|---|---|---|
| | | Room Temp. | −18° C. | | |
| 22 | 650 | 285 $P_5$ | 55 $P_5$ | 2 | 2 |
| 23 | 650 | 285 $P_5$ | 55 $P_5$ | 3 | 3 |

Examples 24–25

A copolymer was prepared in the manner described for Example 1 from the following charge:

Weight (grams)
Poly(tetramethylene oxide)glycol having a molecular weight of 1600 _____ 1200
Dimethylterephthalate _____ 354
Ethylene glycol _____ 280
Dimethyl sebacate _____ 46
Zinc acetate _____ 0.046
Antimony oxide _____ 0.046
Lithium hydride _____ 0.011

The ester exchange reaction was completed in 5 hours. The polymerization reaction which was performed under high vacuum as in Example 1 was carried out for 8 hours to provide a polymer having an inherent viscosity of 1.2. The final polymer had a ratio of 25 polyetherpolyester units derived from ethylene glycol with dimethylterephthalate and dimethyl sebacate and 75 polyetherpolyester units derived from the poly(tetramethylene oxide)glycol with dimethylterephthalate and dimethyl sebacate; the ratio of dimethylterephthalate-to-dimethyl sebacate in each case being 9-to-1.

Coating solutions were prepared by dissolving the copolymer in a 50–50 mixture of toluene-dioxane using 2% by weight of n-octadecanamide in Example 24 and none of the amide in Example 25.

Coating of polyethylene terephthalate film was carried out as in Example 1 to provide, after drying, a coating weight of 8.0 grams per square meter in both examples. The properties of the coated films are presented in Table VII.

TABLE VII

| Ex. | Heat-Seal Strength | Durability | | Slip | Block |
|---|---|---|---|---|---|
| | | Room Temp. | −18° C. | | |
| 24 | 700 | 220 P₅ | 58 P₅ | 2 | 2 |
| 25 | 700 | 220 P₅ | 58 P₅ | 3 | 3 |

Having fully disclosed the invention, what is claimed is:

1. An oriented polyethylene terephthalate film having at least one surface coated with a composition comprising at least 80% of an ordered copolymer of at least three components, the first component being a glycol having the formula HO(CH$_2$)$_a$OH wherein "$a$" is an integer having a value of 2–10, the second component being an acidic component selected from the group consisting of aromatic dibasic acids and esters of aromatic dibasic acids, and the third component being at least one difunctional polyether having the formula HO(RO)$_n$H wherein R is an alkylene radical having 2–4 carbon atoms and $n$ is an integer having a value sufficient to provide a molecular weight for the polyether of 700–6000, the polyether-polyester units from said polyether in said polymer representing 60%–80% by weight of said polymer, said coating composition also containing 2% to 20% of a fatty acid amide having 12–18 carbon atoms.

2. A coated polyethylene terephthalate film as in claim 1 wherein said first component, the glycol, is ethylene glycol.

3. A coated polyethylene terephthalate film as in claim 1 wherein said second component, the acidic component, is dimethylterephthalate.

4. A coated polyethylene terephthalate film as in claim 1 wherein said third component, the polyether, is poly(tetramethylene oxide)glycol having a molecular weight of 700–3000.

5. A coated polyethylene terephthalate film as in claim 1 wherein said third component, the polyether, is poly(ethylene oxide)glycol having a molecular weight of 1000–6000.

6. A coated polyethylene terephthalate film as in claim 1 wherein up to 50% of the acidic component is an aliphatic dibasic acid.

7. A coated polyethylene terephthalate film as in claim 1 wherein up to 50% of the acidic component is an ester of an aliphatic dibasic acid.

8. A coated polyethylene terephthalate film as in claim 1 wherein said fatty acid amide is n-octadecanamide.

9. A coated polyethylene terephthalate film as in claim 1 wherein said fatty acid amide is tetradecanamide.

10. A coating composition comprising 10%–30% solids in an organic solvent, said solids composed of at least 80% of an ordered copolymer of at least three components, the first component being a glycol having the formula HO(CH$_2$)$_a$OH wherein "$a$" is an integer having a value of 2–10, the second component being an acidic component selected from the group consisting of aromatic dibasic acids and esters of aromatic dibasic acids, and the third component being at least one difunctional polyether having the formula HO(RO)$_n$H wherein R is an alkylene radical having 2–4 carbon atoms and $n$ is an integer having a value sufficient to provide a molecular weight for the polyether of 700–6000, the polyether-polyester units from said polyether in said polymer representing 60%–80% by weight of said polymer, said solids also containing 2% to 20% of a fatty acid amide having 12–18 carbon atoms.

11. A coating composition as in claim 10 wherein said first component, the glycol, is ethylene glycol.

12. A coating composition as in claim 10 wherein said second component, the acidic component, is dimethylterephthalate.

13. A coating composition as in claim 10 wherein said third component, the polyether, is poly(tetramethylene oxide)glycol having a molecular weight of 700–3000.

14. A coating composition as in claim 10 wherein said third component, the polyether, is poly(ethylene oxide)glycol having a molecular weight of 1000–6000.

15. A coating composition as in claim 10 wherein up to 50% of the acidic component is an aliphatic dibasic acid.

16. A coating composition as in claim 10 wherein up to 50% of the acidic component is an ester of an aliphatic dibasic acid.

17. A coating composition as in claim 10 wherein said fatty acid amide is n-octadecanamide.

18. A coating composition as in claim 10 wherein said fatty acid amide is tetradecanamide.

19. A process for preparing a packaging film which comprises coating a base film of oriented polyethylene terephthalate with a composition comprising 10%–30% solids in an organic solvent, said solids composed of at least 80% of an ordered copolymer of at least three components, the first component being a glycol having the formula HO(CH$_2$)$_a$OH wherein "$a$" is an integer having a value of 2–10, the second component being an acidic component selected from the group consisting of aromatic dibasic acids and esters of aromatic dibasic acids, and the third component being at least one difunctional polyether having the formula HO(RO)$_n$H wherein R is an alkylene radical having 2–4 carbon atoms and $n$ is an integer having a value sufficient to provide a molecular weight for the polyether of 700–6000, the polyether-polyester units from said polyether in said polymer representing 60%–80% by weight of said polymer, said solids also containing 2% to 20% of a fatty acid amide having 12–18 carbon atoms; removing excess coating composition and drying said coated film.

20. A process as in claim 19 wherein said first component, the glycol, is ethylene glycol.

21. A process as in claim 19 wherein said second component, the acidic component, is dimethylterephthalate.

22. A process as in claim 19 wherein said third component, the polyether, is poly(tetramethylene oxide)glycol having a molecular weight of 700–3000.

23. A process as in claim 19 wherein said third component, the polyether, is poly(ethylene oxide)glycol having a molecular weight of 1000–6000.

24. A process as in claim 19 wherein up to 50% of the acidic component is an aliphatic dibasic acid.

25. A process as in claim 19 wherein up to 50% of the acidic component is an ester of an aliphatic dibasic acid.

26. A process as in claim 19 wherein said fatty acid amide is n-octadecanamide.

27. A process as in claim 19 wherein said fatty acid amide is tetradecanamide.

References Cited in the file of this patent

UNITED STATES PATENTS

| | | |
|---|---|---|
| 2,765,251 | Williams | Oct. 2, 1956 |
| 2,895,946 | Huffman | July 21, 1959 |
| 2,901,451 | Gagarine et al. | Aug. 25, 1959 |
| 3,013,914 | Willard | Dec. 19, 1961 |
| 3,023,192 | Shivers | Feb. 27, 1962 |